R. J. BURROWS.
MOTOR TRUCK AXLE.
APPLICATION FILED MAY 15, 1917.
1,309,239.
Patented July 8, 1919.
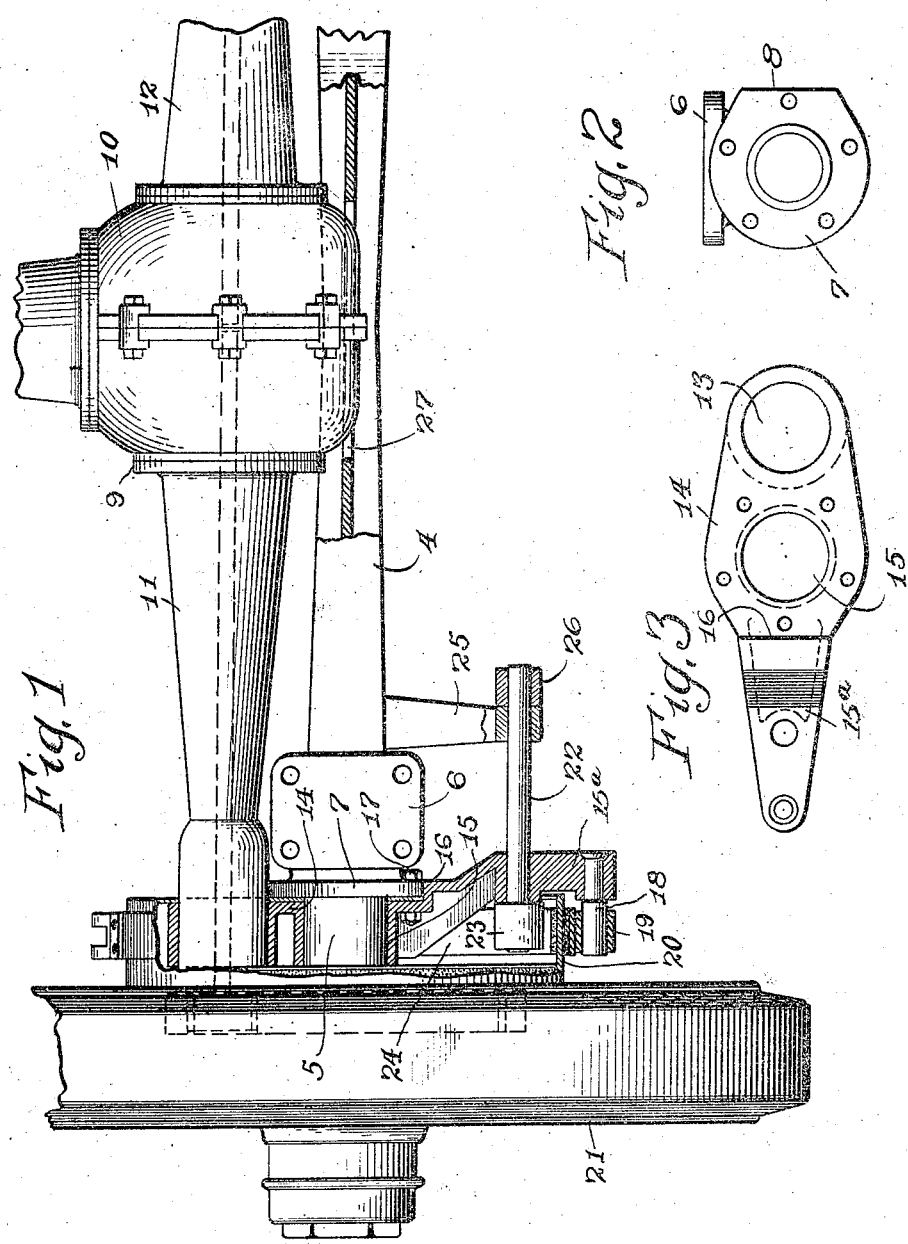

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

MOTOR-TRUCK AXLE.

1,309,239.  Specification of Letters Patent.  Patented July 8, 1919.

Application filed May 15, 1917. Serial No. 168,669.

*To all whom it may concern:*

Be it known that I, ROBERT J. BURROWS, a citizen of the United States, and a resident of Buchanan, in the county of Berrien and State of Michigan, have invented certain new and useful Improvements in Motor-Truck Axles, of which the following is a specification, reference being had to the accompanying drawings.

My invention relates to axles for motor vehicles, and has particularly to do with axles designed for heavy vehicles, such as trucks, in which the rear wheels are mounted on spindles carried by a dead axle and are driven by power applied through a live axle comprising jack-shafts connected with the usual differential gearing and inclosed in a suitable housing. The wheels carry gears, preferably of the internal type, which mesh with pinions carried by the jack-shafts, so that by the rotation of the jack-shafts the wheels are rotated. In some axles of this type, the members of the live axle housing are connected to the dead axle intermediately, and in others they are disconnected except at their ends, and my present invention is more especially for the latter class, although it may beneficially be applied to either. It is well understood that in axles of the type referred to, when power is applied to the jack-shafts to drive the vehicle in a forward direction, the pinions carried by the jack-shafts tend to climb up on the driving gears and consequently to rotate the live axle housing around the dead axle, and where the live axle housing is supported at its ends by brackets secured to the dead axle member merely by bolting, as has heretofore been proposed, the strain on the bolts is very great and tends to shear them off. The object of my present invention is to provide an improved construction by which such brackets will be secured against rotation independently of any bolts that may be used to secure the brackets to the dead axle member, thus avoiding the objection mentioned and providing a construction in which the brackets may readily be applied to or removed from the dead axle member. I accomplish this object as illustrated in the drawings and as hereinafter described. That which I believe to be new is set forth in the claims.

In the accompanying drawings,—

Figure 1 is a partial plan view of my improved axle, certain parts being in section;

Fig. 2 is an end view of the dead axle member, the wheel spindle being omitted; and Fig. 3 is an elevation of one of the brackets by which the live axle housing is mounted upon and secured to the end portions of the dead axle member.

Referring to the drawings,—

4 indicates the dead axle member, which, in the illustration, is preferably an I-beam, but which may be of any other suitable shape. It is provided at each end with a sleeve 5 which forms a socket for the wheel spindle, and with spring-seats 6 upon which the usual springs are mounted and secured. Between the inner ends of the sleeves 5 and the spring-seats are disk-like flanges 7 which, however, are not circular, since they are provided at one or more points in their periphery with flattened surfaces 8, as shown in Fig. 2. In the construction shown, this flattened surface is at the rear.

9 indicates the live axle member, of which 10 indicates the differential housing and 11—12 sleeves which are secured to the housing 10 and form the housing for the jack-shafts by which the wheels are driven. The axes of the sleeves 11—12 are disposed parallel with the dead axle member 4, and their outer ends are fitted into sockets 13 in brackets 14 which are also provided with sockets 15 adapted to fit upon the sleeves 5, as shown in Fig. 1. The brackets 14 are also provided with offset arms 15$^a$, each of said arms having an abutment 16 which is adapted to register with and fit closely upon the flattened surface 8 of the flange 7 when the brackets are slipped endwise upon the end portions of the dead axle, as shown in Fig. 1. Thus, it will be seen that the bracket 14 when in position is held against rotation upon the sleeve 5, and consequently the live axle housing is prevented from rotating about the dead axle member. There is, therefore, no shearing strain upon the bolts 17 which may be employed to secure the bracket 14 upon the sleeve 5, as shown in Fig. 1. As indicated in Fig. 2, any suitable number of bolts 17 may be used, said bolts passing through the bracket 14 and flange 7. Besides supporting the live axle housing, the brackets 14 also carry pins 18 which support external brakes 19 operating upon a brake-drum 20 carried by the wheel 21. They also form bearings for shafts 22 which carry cams 23 which operate internal brakes 24. In the construction shown, the inner ends of the shafts 22 are supported by arms 25 secured to the dead axle member 4 and are rocked by levers 26 shown in section in Fig. 1.

In the illustration of Fig. 1 the differential housing 10 is shown as extending partly into a central opening 27 in the dead axle member, without, however, being connected with said dead axle, but this arrangement is not essential to my invention, as there need be no interfitting or overlapping of the two principal members of the axle, and the axle members may be of any other suitable design. The jack-shafts and gearing are not shown, as any known arrangement of gears suitable for the purpose may be employed.

That which I claim as my invention, and desire to secure by Letters Patent, is,—

1. A motor vehicle axle of the type described, comprising a dead axle member having wheel spindles and circular end portions adjacent thereto, a live axle housing associated therewith, brackets having circular sockets fitted upon the circular end portions of said dead axle member and supporting the outer end portions of said housing, inter-fitting means carried by said brackets and said dead axle member for preventing rotation of said brackets, and means securing said brackets to said dead axle member.

2. A motor vehicle axle of the type described, comprising a dead axle member, a live axle housing associated therewith, and a bracket fitted upon the outer end portion of said dead axle member and having an abutment, said dead axle member having a non-circular flange which fits against said abutment and prevents rotation of said bracket, one end of said housing being supported by said bracket.

3. A motor vehicle axle of the type described, comprising a dead axle member, a live axle housing associated therewith, and a bracket fitted upon the outer end portion of said dead axle member and having an abutment, said dead axle member having a non-circular flange which fits against said abutment and prevents rotation of said bracket, one end of said housing being fitted in a socket in said bracket.

4. A motor vehicle axle of the type described, comprising a dead axle member, a live axle housing associated therewith, and a bracket having a socket adapted to fit upon the outer end portion of said dead axle member and having an abutment, said dead axle member having a non-circular flange which fits against said abutment and prevents rotation of said bracket, one end of said housing being fitted in another socket in said bracket.

5. A motor vehicle axle of the type described, comprising a dead axle member having wheel spindles and circular end portions adjacent thereto, a live axle housing associated therewith, brackets having circular sockets fitted upon the outer end portions of said dead axle member and supporting the circular end portions of said housing, inter-fitting means carried by said brackets and said dead axle member for preventing rotation of said brackets, means securing said brackets to said dead axle member, and brake mechanism supported by said brackets.

6. A motor vehicle axle of the type described, comprising a dead axle member, a live axle housing associated therewith, and a bracket having a socket adapted to fit upon the outer end portion of said dead axle member and having an offset arm forming an abutment, said dead axle member having a non-circular flange which fits against said abutment for preventing rotation of said bracket, one end of said housing being supported by said bracket.

7. A motor vehicle axle of the type described, comprising a dead axle member, a live axle housing associated therewith, a bracket having a socket adapted to fit upon the outer end portion of said dead axle member and having an offset arm forming an abutment, said dead axle member having a non-circular flange which fits against said abutment for preventing rotation of said bracket, one end of said housing being supported by said bracket, and brake mechanism supported by said arm.

8. A motor vehicle axle of the type described, comprising a dead axle member having wheel spindles and end portions circular in cross-section adjacent to the inner ends of said wheel spindles, a live axle housing associated therewith, brackets having circular sockets adapted to fit and move endwise upon said end portions of said dead axle member, and inter-fitting means carried by said dead axle member and said brackets for preventing rotation of said brackets upon said dead axle member, the end portions of said live axle housing being supported by said brackets.

ROBERT J. BURROWS.